United States Patent [19]

Nadan

[11] Patent Number: 5,142,576
[45] Date of Patent: Aug. 25, 1992

[54] SYSTEM FOR SECURELY PROVIDING RESTRICTED VIDEO INFORMATION

[75] Inventor: Joseph S. Nadan, New York City, N.Y.

[73] Assignee: Market Data Corporation, New York, N.Y.

[21] Appl. No.: 698,231

[22] Filed: May 6, 1991

Related U.S. Application Data

[63] Continuation of Ser. No. 590,525, Sep. 27, 1990, abandoned, which is a continuation of Ser. No. 307,731, Feb. 7, 1989, abandoned.

[51] Int. Cl.$^5$ .............................................. H04N 7/167
[52] U.S. Cl. ........................................ 380/20; 380/10; 358/86; 358/147
[58] Field of Search ............... 340/711, 717, 825.26, 340/825.27; 380/10, 14, 20, 23, 49, 50; 358/85, 86, 142, 145, 144, 147; 455/4; 364/408, 918.7, 918.8, 918; 395/425, 600, 725

[56] References Cited

U.S. PATENT DOCUMENTS

| | | |
|---|---|---|
| Re. 31,863 | 4/1985 | Saylor et al. . |
| Re. 32,326 | 1/1987 | Nagel et al. . |
| Re. 32,776 | 11/1988 | Saylor . |
| 3,611,294 | 5/1971 | O'Neill et al. ............... 340/825.26 |
| 3,801,961 | 4/1974 | Coombe . |
| 3,875,329 | 4/1975 | Nagel . |
| 3,889,054 | 6/1975 | Nagel et al. . |
| 4,032,972 | 6/1977 | Saylor . |
| 4,042,958 | 8/1977 | Saylor et al. . |
| 4,054,911 | 10/1977 | Fletcher et al. . |
| 4,064,490 | 12/1977 | Nagel . |
| 4,099,258 | 7/1978 | Parsons ........................ 364/919 X |
| 4,104,681 | 8/1978 | Saylor . |
| 4,120,003 | 10/1978 | Mitchell et al. . |
| 4,129,748 | 12/1978 | Saylor . |
| 4,135,213 | 1/1979 | Winfield et al. . |
| 4,148,066 | 4/1979 | Saylor . |
| 4,361,848 | 11/1982 | Poignet et al. ............... 340/711 X |
| 4,371,871 | 1/1983 | Adams . |
| 4,388,489 | 6/1983 | Wigan et al. . |
| 4,404,551 | 9/1983 | Howse et al. . |
| 4,525,779 | 6/1985 | Davids et al. . |
| 4,531,184 | 7/1985 | Wigan et al. . |
| 4,555,781 | 11/1985 | Baldry et al. . |
| 4,600,921 | 7/1986 | Thomas ........................... 380/20 X |
| 4,677,434 | 6/1987 | Fascenda .................. 340/825.26 X |
| 4,745,559 | 5/1988 | Willis et al. ..................... 364/408 X |
| 4,750,135 | 6/1988 | Boilen ............................. 358/144 X |
| 4,751,640 | 6/1988 | Lucas et al. ......................... 364/408 |
| 4,829,569 | 5/1989 | Seth-Smith et al. .................. 380/10 |

OTHER PUBLICATIONS

Brochure entitled, "An Introduction to TRIARCH TM 2000," copyright 1989 Rich, Inc.
Brochure entitled, "TRIARCH TM 2000 Trading information architecture," (undated).
Product information on "TRIARCH TM 2000 Workstation Cluster server (Color)," copyright 1989 Rich, Inc.
Product information on "Rich Video Switch (RVS)," copyright 1989 Rich, Inc.
Joseph S. Nadan et al., "Trading Information System Requirements: An Overwiew," IEEE Communications Society—New York Section: Seminar Proceedings on "Management and Maintenance of Communications Networks," Dec. 4, 1986.

*Primary Examiner*—Tod Swann
*Attorney, Agent, or Firm*—Davis, Hoxie, Faithfull & Hapgood

[57] ABSTRACT

A system for securely providing restricted information having an encoder for transmitting selected update data with respective keys and a plurality of uniquely identified decoders for receiving said update data. When saidd decoder matches the key sent with said update, said decoder receives the update data and appropriately positions said update data in respective pages in a store for subsequent viewing on a video display.

51 Claims, 12 Drawing Sheets

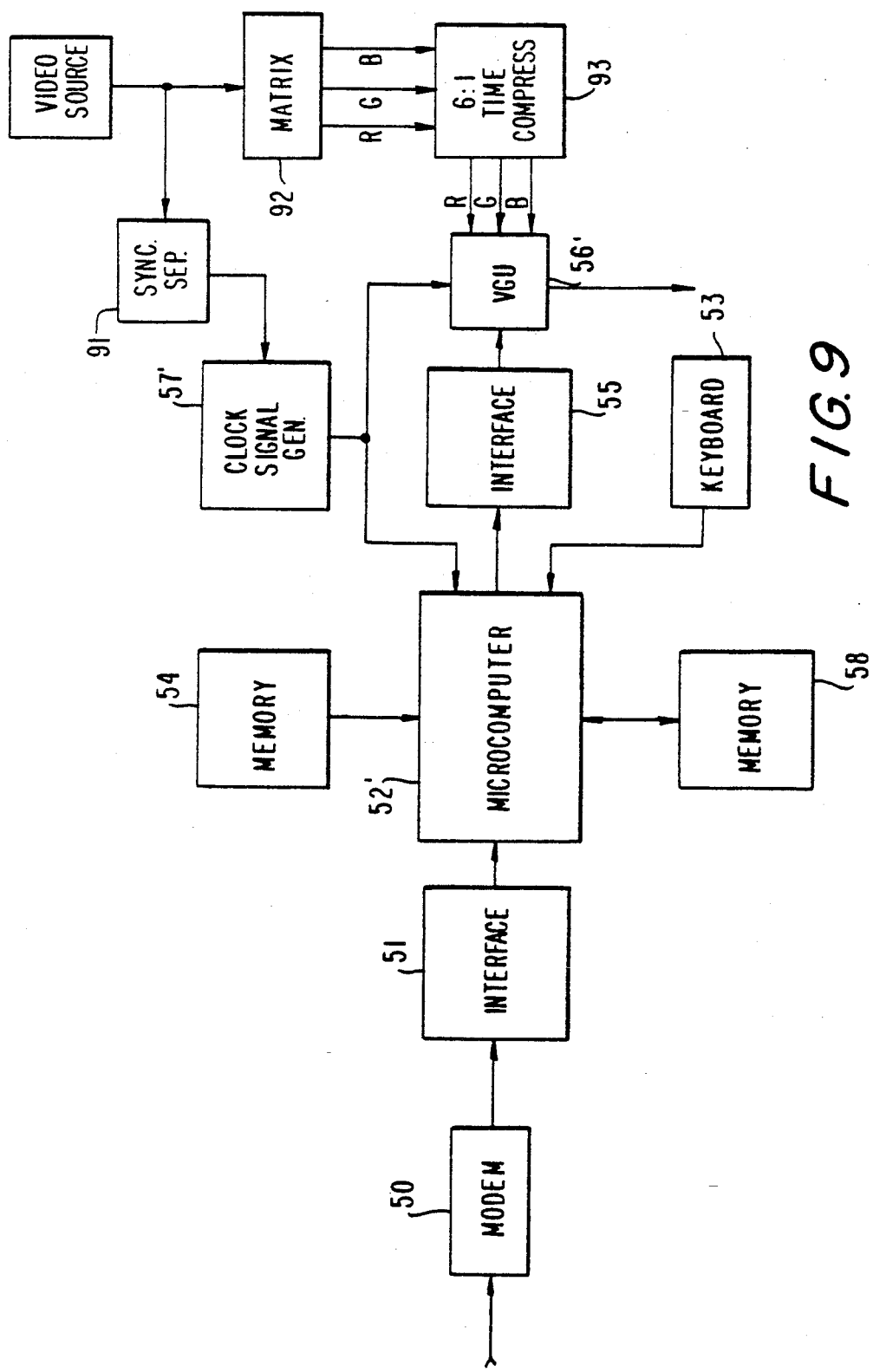

SYSTEM FOR SECURELY PROVIDING RESTRICTED VIDEO INFORMATION

This is a continuation of copending application Ser. No. 07/590,525 filed on Sept. 27, 1990 now abandoned, which is a continuation of copending application Ser. No. 07/307,731 filed on Feb. 7, 1989 now abandoned.

BACKGROUND OF THE INVENTION

1. Field of the Invention

The subject invention relates to the distribution of information and, more particularly, for distributing this information in a secure and restricted manner.

Applicant and other related companies are in the business of distributing realtime financial market information to various clients who use this information to carry on their business. When a client subscribes for this service, an agreement is entered into in which the client indicates which information is desired and states the number of video displays which will be accessing the information and, based on this number, a fee is assessed to the client and the information then is transmitted to the client.

2. Description of Related Art

Typically, this financial market information is presented to clients as pages on an electronic display screen, portions of which, from time to time, are updated to reflect changes in the market. Various clients then subscribe to view specific ones of these pages. The video signals for producing these pages are usually produced by a controller that is installed in the client's office for selectively generating the subscribed-for pages on the corresponding display screens. Each full page is repeatedly transmitted in video at a field rate for realtime display, similar to that of a television transmission. However, once the video signal is produced, there is nothing to prevent the client from connecting any number of video displays to the controller, above and beyond the number stated in the agreement; nothing save the personal integrity of the client. This practice dilutes the revenues to which the provider would ordinarily be entitled.

SUMMARY OF THE INVENTION

An object of the present invention is to provide a system capable of securely providing restricted video information.

A further object of the present invention is to provide a system which is capable of uniquely identifying each of the video displays authorized to receive information, to restrict this information to only these individual video displays, to identify which of the information these video displays are to receive, and to present only authorized information on each and every video display; unauthorized video displays would only present transmogrified versions of the pages.

Applicant has recognized that usually only small portions of the full page change from field to field. It is therefore necessary to transmit only the information which is changing and then to store this update data, along with the unchanged data, at the video display for subsequent display.

With these facts in mind, the above objects are achieved in a system for securely providing restricted information, wherein the system includes an encoder for encoding update data for updating various pages of information, and a plurality of decoders for decoding said update data and generating said various pages on the display screens of a respective plurality of video displays, characterized in that said encoder comprises means for generating a first data stream, said first data stream including respective pairs of unique display codes identifying each video display and individual page codes for each of said pages, said pairs being indicative of the pages for which each video display of each subscriber is authorized to receive; means for generating a sequence of second data streams, each of said second data streams including one of said individual page codes, coordinates of an area in a relevant display screen that is to display update data, and the respective updata data; and means for transmitting said first data stream followed by said sequence of second data streams; and in that each of said decoders comprises means for identifying the relevant decoder with one of said unique display codes; means for recognizing said one unique display code and for storing the individual page codes paired with said one unique display code; means for retrieving said display coordinates of the update data corresponding to each of said stored individual codes; means for storing said update data at the related coordinates for each display screen for subsequent display; and means for selectively displaying said stored pages on the video displays.

DESCRIPTION OF THE DRAWINGS

With the above and additional objects and advantages in mind as will hereinafter appear, the invention will be described with reference to the accompanying drawings, in which:

FIG. 9 is a block diagram of an encoder in the second embodiment of the invention.

DESCRIPTION OF THE PREFERRED EMBODIMENT

As noted above, the object of the present invention is to distribute information. This information is transmitted over, for example, telephone lines and converted on the client site into video signals similar to those for television reception. The information subscribed to takes the form of pages of market data, various portions of which are updated from time to time to reflect changes in the market, and subsequently presented on a video display.

Figure 1:
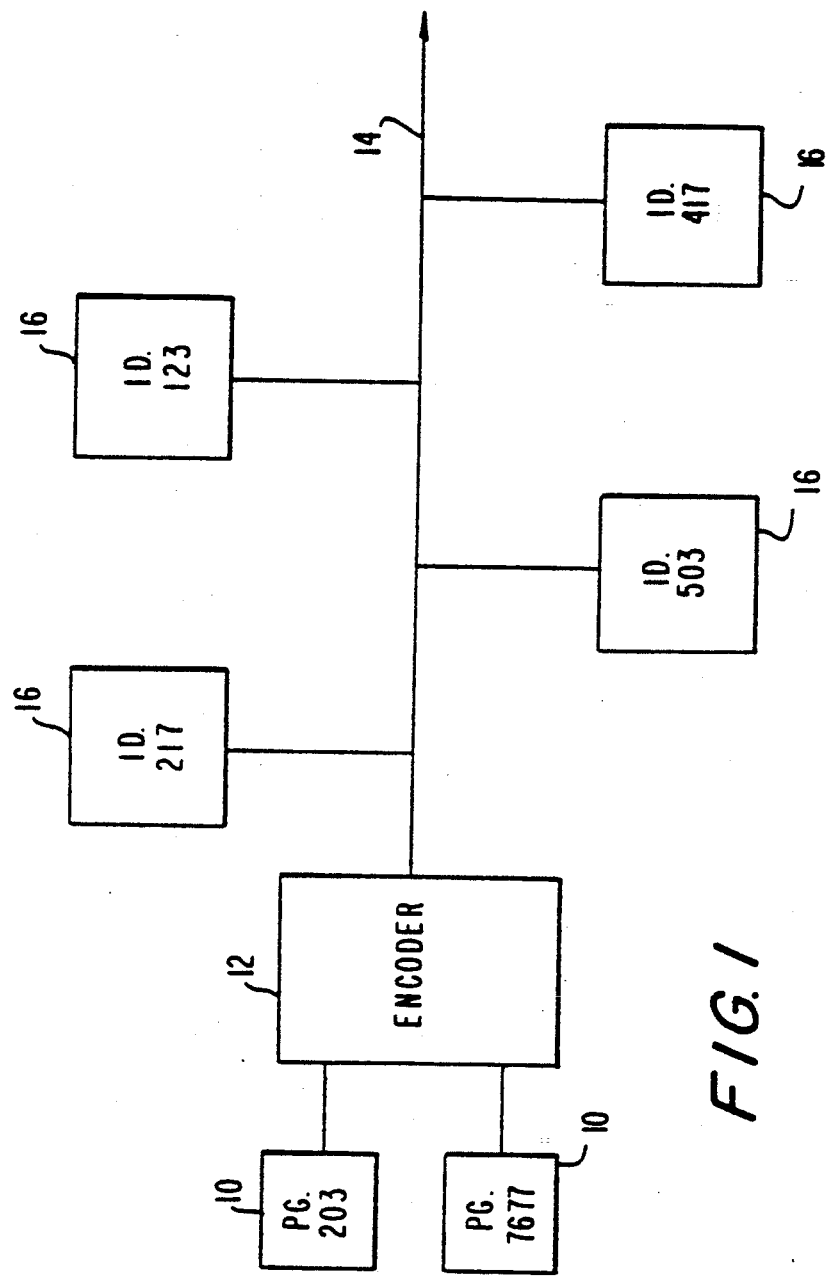
FIG. 1 is a block diagram of a system according to the invention.

In a first embodiment of the invention, the video signals representing the market information are being transmitted asynchronously, that is, there are no set characteristic times (e.g. television field and frame rates) to restrict the transmission. As shown in FIG. 1, pages 10 of market data are each given individual page key (PK) codes, for example "page 203" and "page 7677". These pages 10 are then applied to an encoder 12 for application to a video transmission line 14. Video displays 16 are shown connected to the transmission line 14 for receiving the encoded pages 10. As shown, each of the video displays 16 has a unique display identification (ID) code, for example 217, 503, 123 and 417, as shown.

Figure 2:
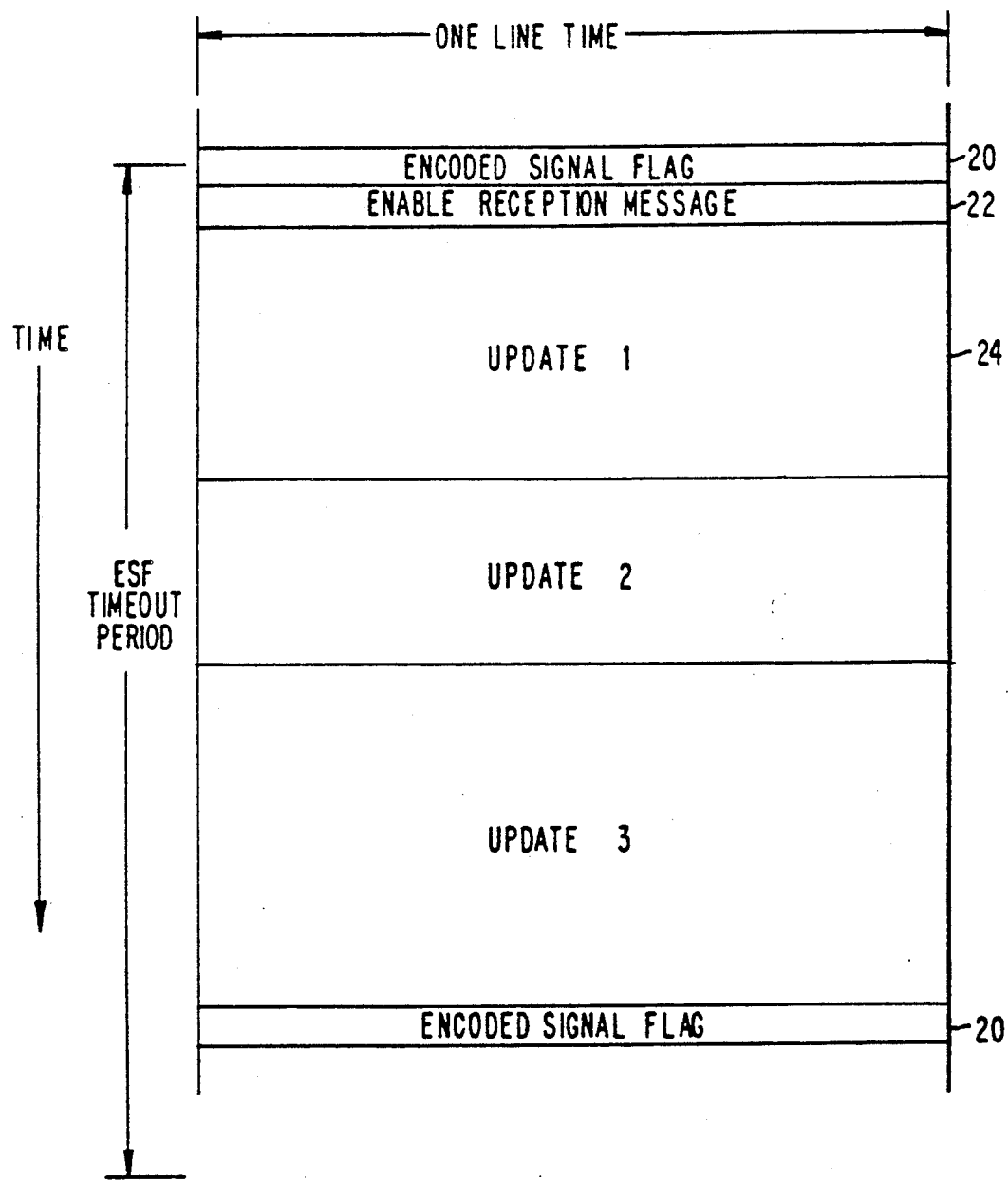
FIG. 2 is a diagram representing the transmitted first data stream and the sequence of second data streams in a first embodiment of the invention.

FIG. 2 shows a diagram representing the video signals transmitted over the video transmission line 14. Since these signals are in the form of television signals, it should be understood that the video signals for each page of market information is in the form of a sequence of video lines which, when scanned on the video displays, form the relevant pages. As shown in FIG. 2, a first line 20 of the transmission includes an encoded signal flag indicating to the video displays 16 that the following information is encoded data. The exact form of the flag is unimportant since the information contained is just one bit. Hence, the flag may be similar to, but not identical to, the vertical synchronizing signal indicating the beginning of each field of information. The line or lines 22 contain enable reception messages. The lines 24 following the enable reception message lines 22, contain the various updates 1, 2 and 3.

Figure 3A:
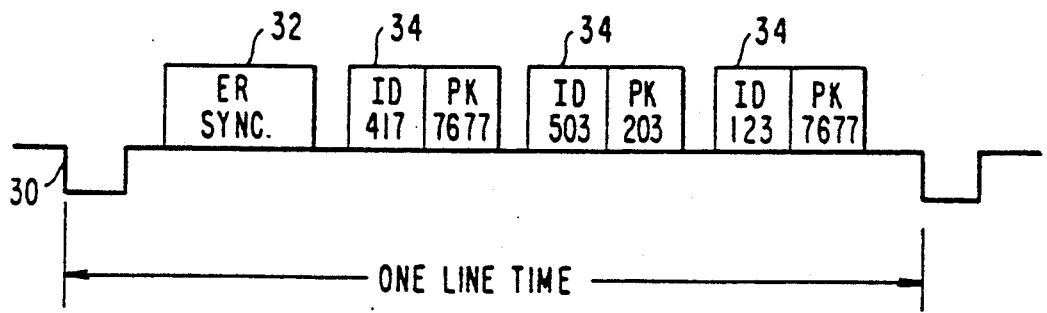
FIG. 3A shows a diagram representing a characteristic first data stream.
Figure 3B:
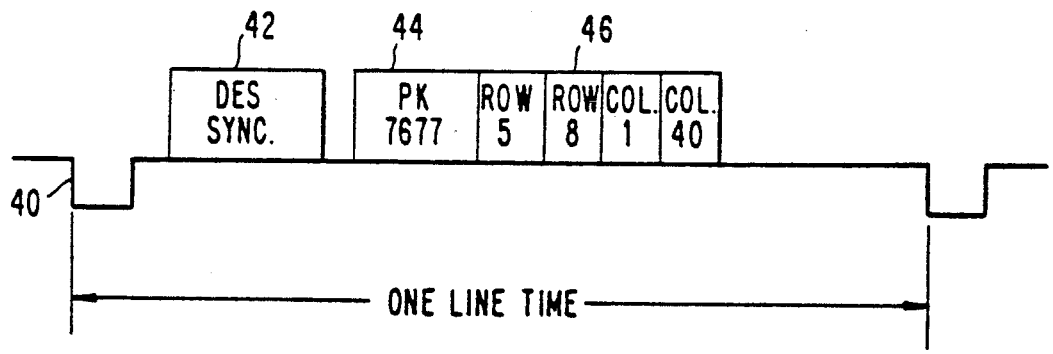
FIGS. 3B–3F show diagrams representing characteristic sequences in the second data streams, all in the first embodiment of the invention.
Figure 3C:
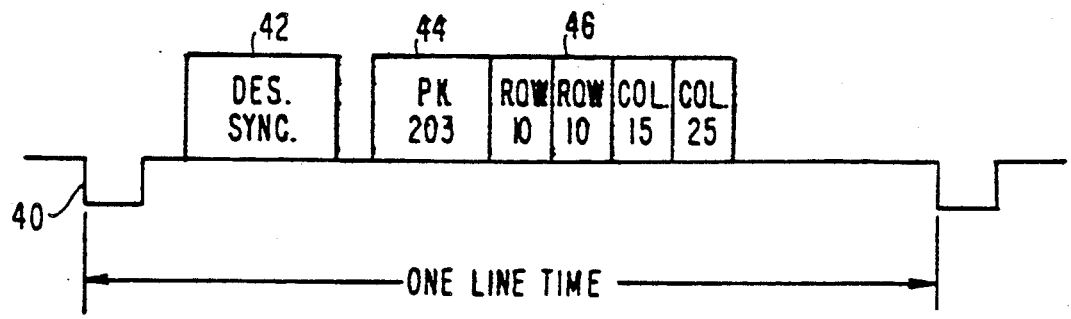
Figure 3D:
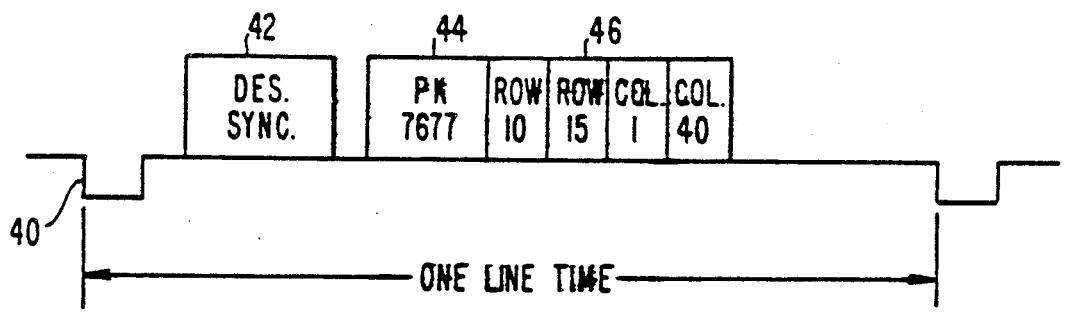

FIG. 3A shows a sample enable reception (ER) message line 22 in detail. Following a horizontal synchronizing pulse 30, an ER synchronizing signal 32 is sent indicating the ensuing transmission of enable reception messages and enabling decoders to synchronize to the transmission. The ER sync. signal 32 is followed by ID/PK conversion pairs 34 each of which includes one of the unique display ID codes and one of the individual page key (PK) codes for which the display identified by the display code is authorized to receive. In the example shown, the pairs 417/7677, 503/203 and 123/7677 indicate that video display 417 is authorized to receive page 7677, display 503, page 203; and display 123, page 7677. It should be noted that in the example, display 417 is not authorized to receive either page 203 or page 7677. The enable reception message continues for as many lines (each including an ER sync. signal 32) and includes as many pairs 34 as are required to associate each of the authorized displays with one of the (many) subscribed to pages.

Figure 3E:
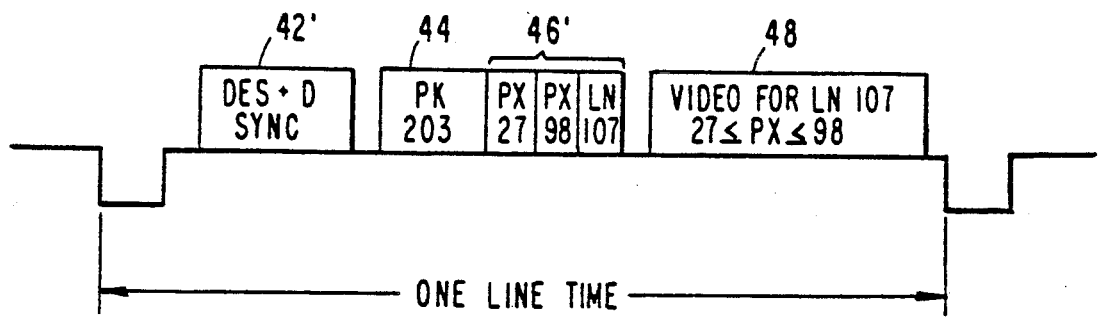
Figure 3F:
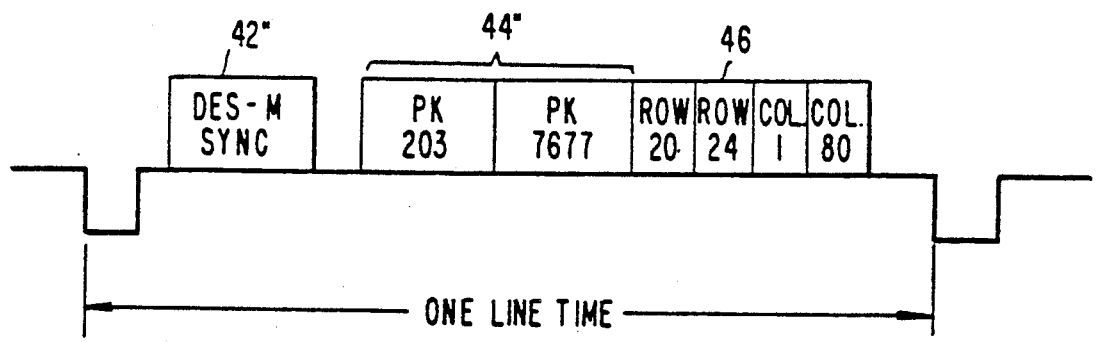
Figure 4:
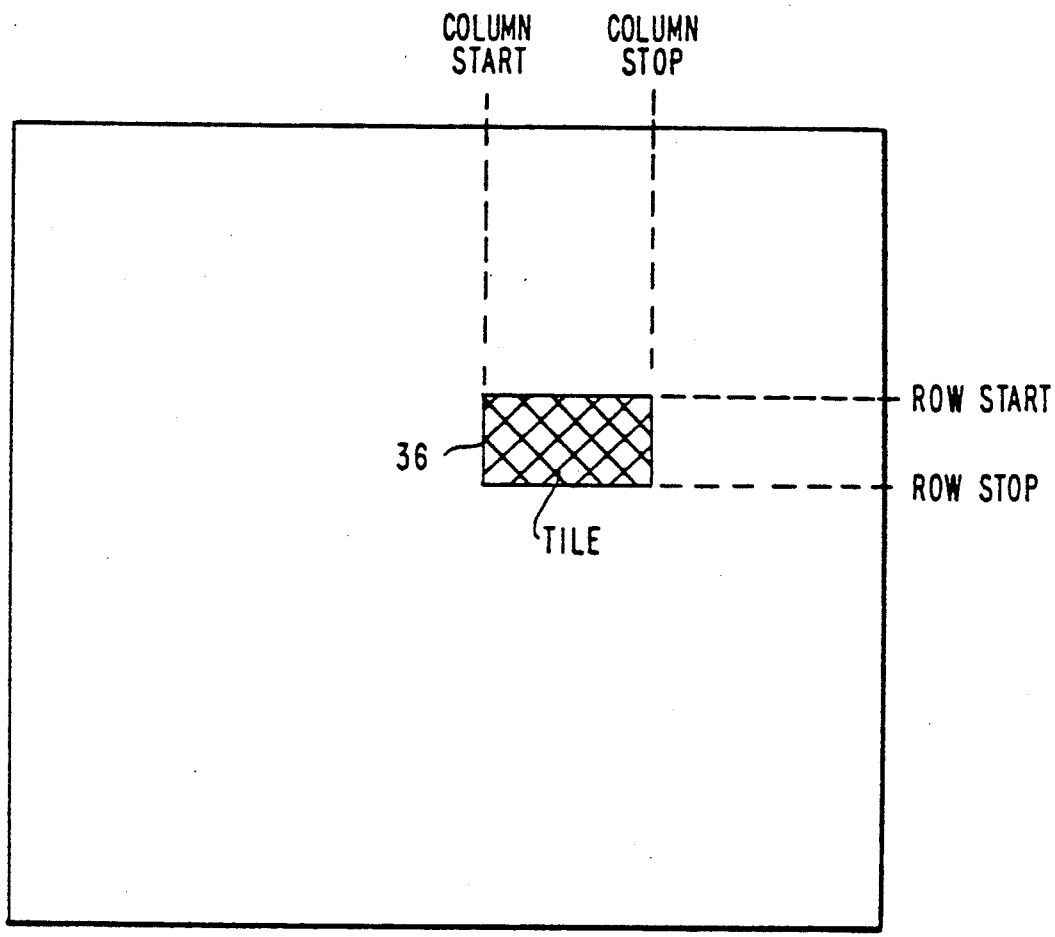
FIG. 4 shows a display screen having a sample market information page thereon in which a block of data to be updated is shown in cross-hatch.

The process for updating each page is performed by replacing "tiles" in the relevant page. As shown in FIG. 4, the cross-hatched tile 36 to be updated is located by two row and two column (or two x-y pixel pair) coordinates. FIGS. 3B-3F show samples of the data enable sequences, in which, in FIG. 3B, the sequence for the update of page 7677 is illustrated. In particular, after a horizontal synchronizing pulse 40, a data synchronizing signal 42 is present. This sync. signal 42, which indicates the ensuing transmission of a data enable sequence, is followed by the individual page code 44 for the page 7677 and then the coordinates 46 of the tile 36 to be replaced which, in this example, is 4 rows by 40 columns. The actual data for this tile 36 is presented in a series of lines, corresponding to the number of rows in the tile to be updated, following the data enable sequence line. Similar examples are shown for pages 203 and 7677 in FIGS. 3C and 3D, in which in page 203, a tile of 1 row and 11 columns is updated, and again in page 7677, a second tile of 6 rows and 40 columns is updated. Alternatively, as shown in FIG. 3E, the update data may appear on the same line as the data enable sequence. In particular, the sync. signal 42' is followed by the individual page code 44. However, the coordinates 46' include the pixel start number and the pixel stop number of a single row of the update data, along with the line number of the particular line. The update data 48 then follows on the same line. Each tile 36 is then composed of the update data 48 appearing in, for example, a plurality of consecutive lines. Further, as shown in FIG. 3F, the update data may be presented simultaneously on one line for more than one page at a time. In particular, the sync. signal 42" is followed by two page codes 44''', and then the coordinates 46 of the tile 36 to be replaced, which in this example, is 5 rows by 80 columns, toward the bottom of pages 203 and 7677. Additionally, all authorized displays connected to the video transmission may be simultaneously updated at the same coordinates by using a special page key, e.g. PK=0.

Figure 5:
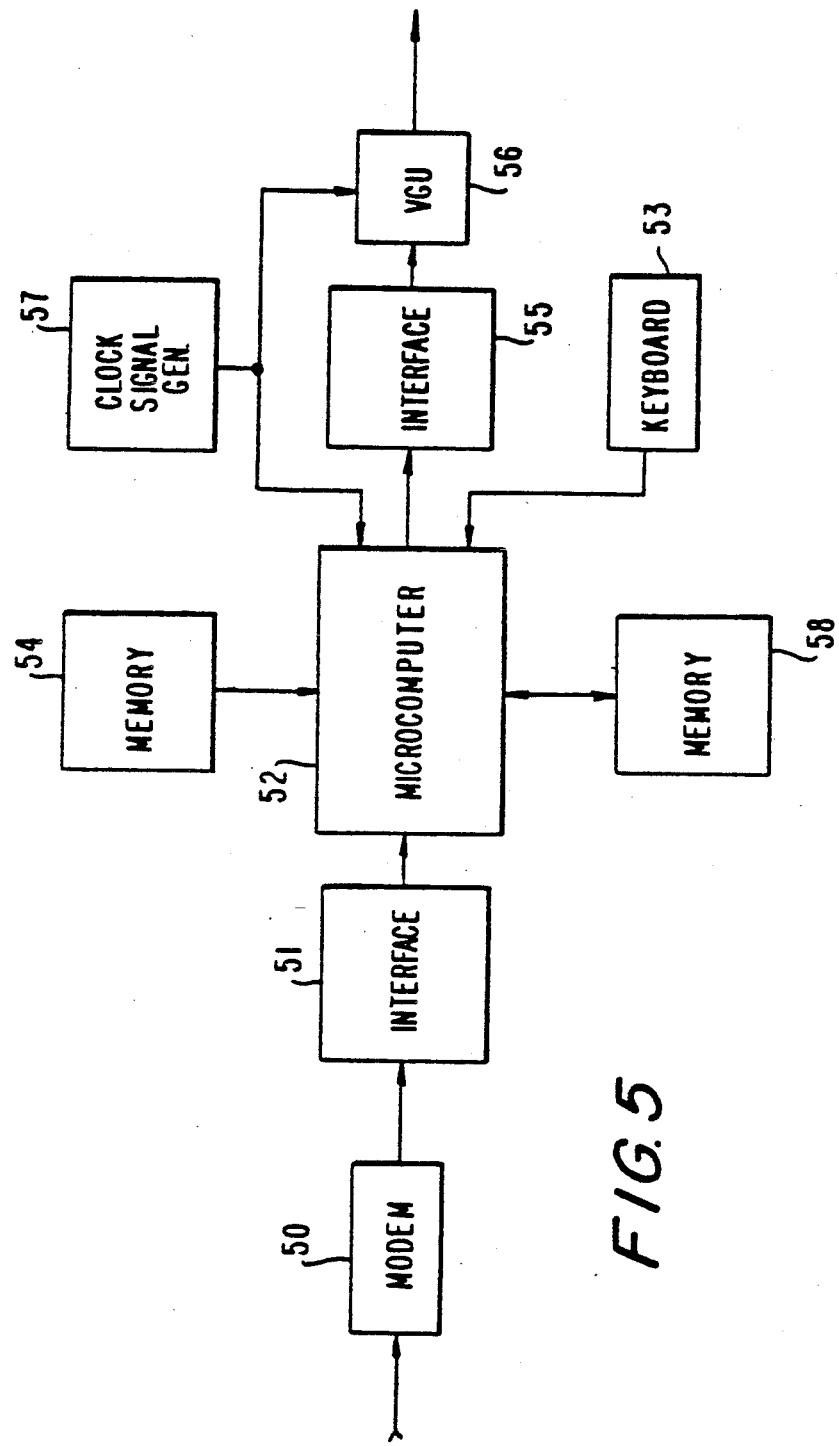
FIG. 5 shows a block diagram of an encoder in the system according to the first embodiment of the invention.

An encoder for the first embodiment of the invention is shown in FIG. 5. The encoder includes a modem 50 for receiving data from a source of market information. This data may be in the form of entire pages of financial information where portions are updated, or the update data itself along with information for the positioning of the update data on the respective display screen. The output of modem 50 is connected to an interface 51, which is, in turn, connected to the input of a microcomputer 52. The microcomputer 52 reassigns the data to appropriate locations in new pages for clients of the provider. A keyboard 53 is connected to the microcomputer 52 for controlling the microcomputer. A memory 54 is connected to the microcomputer 52 and supplies thereto the configuration of the new pages, the individual page key (PK) code for each of the new pages, and the display (ID) codes of the clients authorized to receive each of the new pages. Based on this information, the microcomputer 52 generates the first data stream and the sequence of second data streams. The output of the microcomputer 52 is applied through an interface 55, to a video generation unit 56 which reconfigures the output of the microcomputer into video lines. The video generation unit 56 also generates the encoded signal flag and inserts the various synchronizing signals at the beginning of each of the video lines. A clock signal generator 57 is connected to the video generation unit 56 and the microcomputer 52 for applying timing signals thereto at the line frequency. In the event that the financial information applied to the modem 50 is in the form of entire pages, a memory 58 is connected to the microcomputer 52 into which the pages are entered enabling the microcomputer 52 to compare one page with the update of the page to extract therefrom only the update data.

Figure 6:
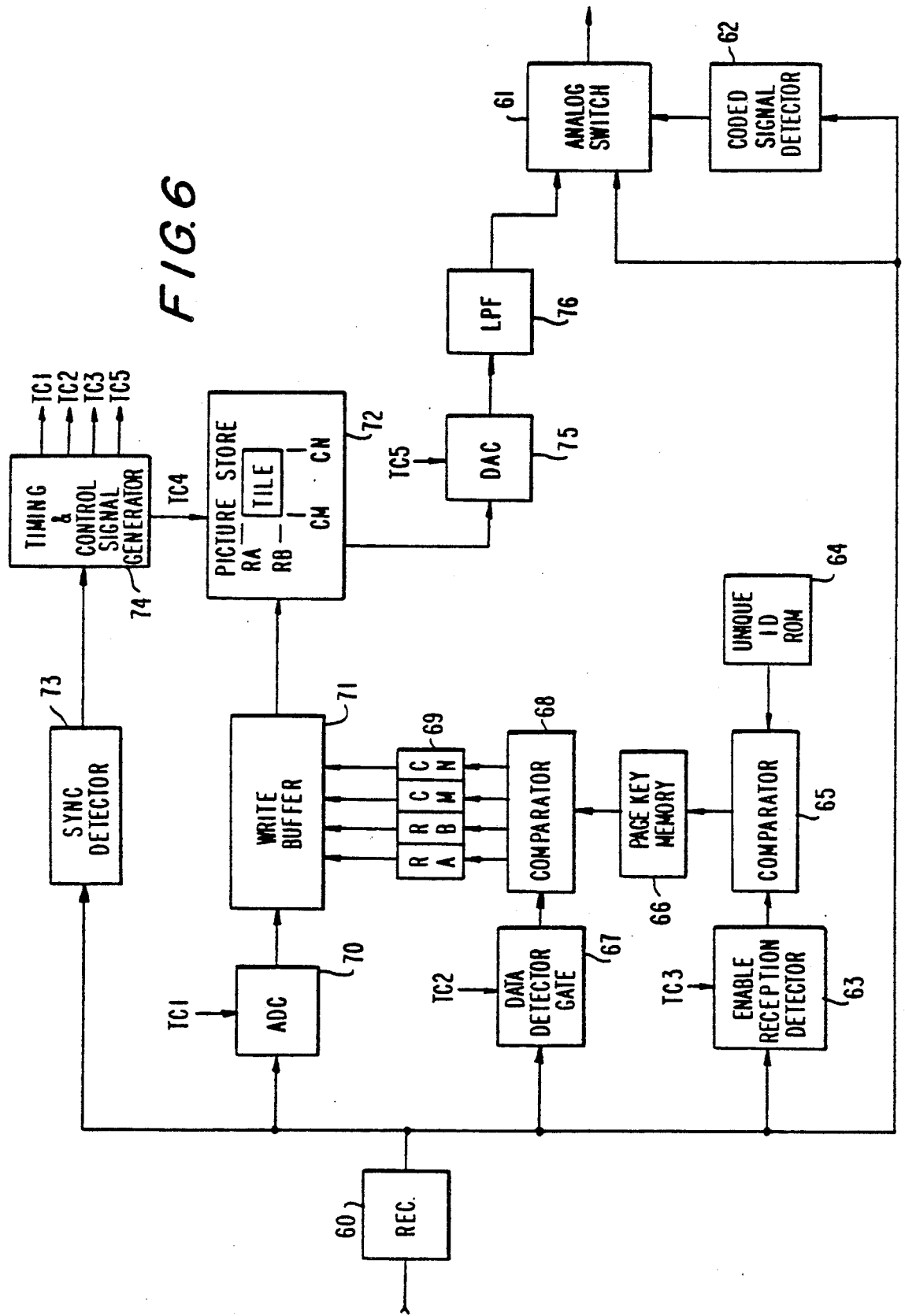
FIG. 6 shows a block diagram of a decoder in the system according to the first embodiment of the invention.

FIG. 6 is a block diagram of a decoder for use with the encoder of FIG. 5. The decoder includes a receiver 60 for receiving the data transmitted by the video generation unit 56. The output of the receiver 60 is applied to an analog switch 61 for selective application to an output display in the event that standard non-coded signals are being transmitted. A coded signal detector 62 is coupled to the receiver 60 for receiving the encoded signal flag and for switching the analog switch 61 accordingly. An ER detection gate 63 is connected to the receiver 60 for receiving the enable reception messages containing the display ID/individual PK code pairs. Each of the received display ID codes are compared with a unique display ID code stored in a ROM 64 by a comparator 65. Upon each match of the display ID code, the individual PK code for the respective page is stored in a memory 66. The output of the receiver 60 is further connected to a data detection gate 67 for receiving the data enable sequences. The individual PK codes in the received data enable sequences are compared in a comparator 68 with the individual PK codes stored in the memory 66. Upon a match of one of these PK codes, the accompanying coordinates of the update data are loaded into registers 69. An analog-to-digital converter 70 digitizes the appropriate update data at the output of the receiver 60 and applies its output to a write buffer 71, which also receives the output of the registers 69. The output of the write buffer 71 is applied to a picture store 72 in which the section therein corresponding to the location of the update data is updated. A synchronizing signal detector 73 is connected to the output of the receiver 60 for separating the line synchronizing signals. The output of the synchronizing signal detector 73 is applied to a timing and control signal generator 74 for generating timing signals for the analog-to-digital converter 70, the data detection gate 67, the ER detection gate 63 and the picture store 72. The output of the picture store 72 is applied to a digital-to-analog converter 75 controlled by the timing and control signal generator 74. The output of the digital-to-analog converter 75 is applied through a low-pass filter 76 to another input of the analog switch 61.

In a second embodiment of the invention, the video signals representing the market information include three colors. In addition, standard television signals are included in the video signals for selective viewing of realtime television on the video displays. This transmission is necessarily synchronous to the chosen television standard. Assuming that the video signals are being transmitted by cable, resulting in a usable bandwidth of approximately 24 MHz.

Figure 7:
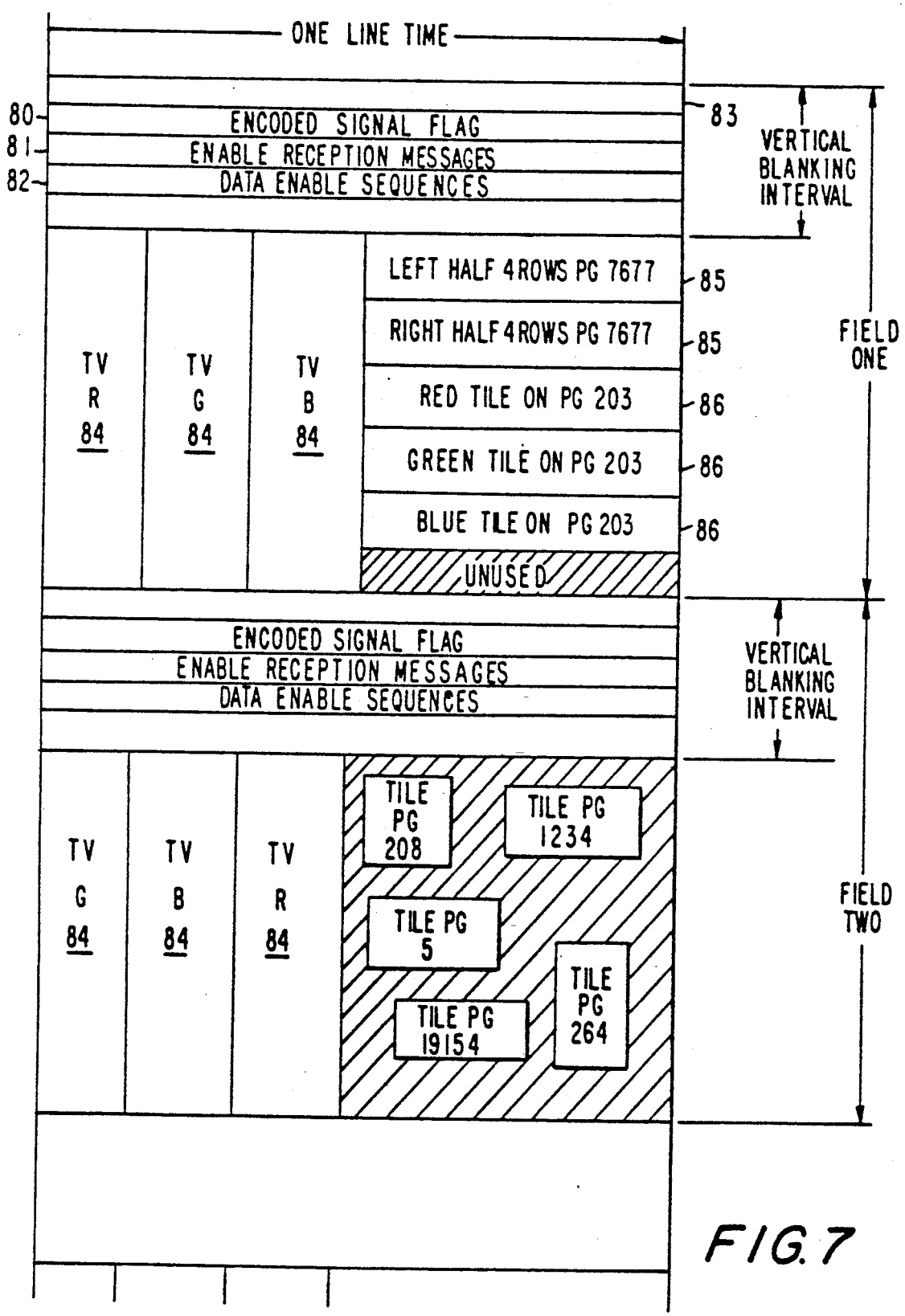
FIG. 7 is a diagram representing the transmitted video signals in a second embodiment of the invention.

FIG. 7 shows a pictorial representation of the transmitted video signals. The encoded signal flag line 80, the enable reception messages lines 81 and the data enable sequence lines 82 are transmitted during the vertical blanking interval 83 between each field of the video signal. During the active video portion of the field, in a first half of each scanning line, the television R, G and B signals 84, each originally having a bandwidth of 4 MHz. and each time compressed by a factor of six to an expanded bandwidth of 24 MHz., are sequentially transmitted. In the second half of each scanning line, the update data for individual pages of the market information are transmitted. While the television signals 84 are in color, the update information may be monochromatic, color or a mixture of both. In particular, as shown, the first 8 half-lines contain the update monochrome data 85 for the left half and right halves, respectively, for page 7677. The update data 85 for page 7677 is followed by the update data 86 for page 203. The update data 86 is presented in color as the three color signals R, G and B. The remainder of the right half of the first field is shown as being unused in this example. The left half of the second field contains the G, B and R components of the television signals 78'. The right half of the second field contains the monochromatic update data for the pages 208, 1234, 5, 19154 and 264.

Figure 8A:
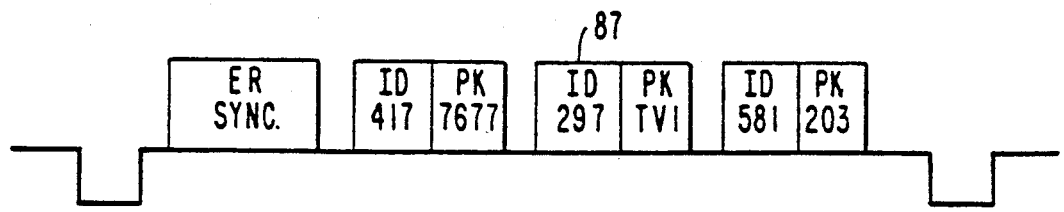
FIG. 8A shows a diagram representing the transmitted first data stream.
Figure 8B:
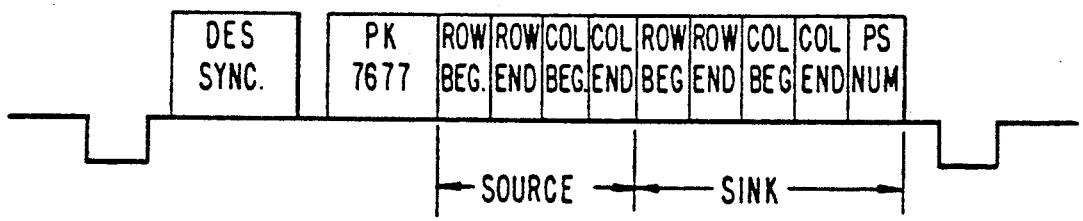
FIGS. 8B and 8C show diagrams representing the second transmitted data stream in the second embodiment of the invention.
Figure 8C:
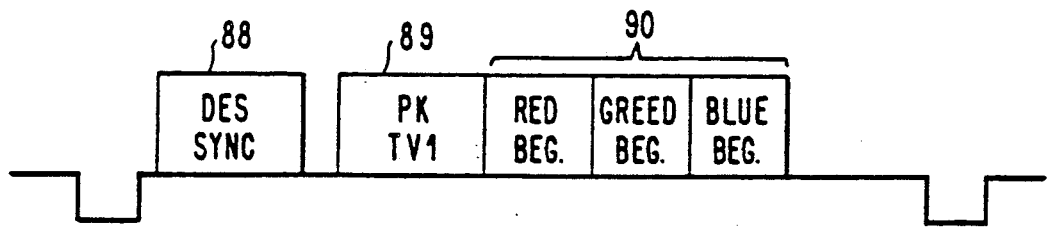

Due to the complex ordering of the update data in the first and second fields, the data enable sequences in the lines 82 must necessarily be more complex than those shown in FIG. 3B–3F. In addition, the enable reception messages must indicate which of the video displays is authorized to receive the television signals sent with the update data. In particular, as shown in FIG. 8A, the enable reception messages are similar to those shown in FIG. 3A, with the exception that in addition to the display ID code/identification PK code pairs, the messages include a pair 87 indicating which of the video displays, for example, the display with display ID code 297, is authorized to receive the television signals TV1. FIG. 8B shows a sample data enable sequence which includes, in addition to that described with respect to FIGS. 3B–3F, the coordinates of the update data in the source field. FIG. 8C shows a sample of the data enable sequence for identifying the television signals, and includes a data synchronizing signal 88, a television PK code 89 and the starting coordinates 90 of the three color signals—red, green and blue.

FIG. 9 shows a block diagram of an encoder for the second embodiment. The video generation unit 56' has a second set of inputs for receiving the three color components of the television signals. In particular, a source of video signals is connected to a synchronizing signal separation circuit 91 for detecting the vertical and horizontal synchronizing signals in the video signals. The source of the video signals is also connected to a matrix circuit 92 for providing the three color components. Each of these components is subjected to a 6:1 compression in compression circuit 93 and the three components are then applied to the video generation unit 56'. The clock signal generator 57' applies horizontal and vertical synchronizing signals to both the video generation unit 56' and the microcomputer 52', and receives the synchronizing signals from the separation circuit 91 for synchronization therewith.

Figure 10:
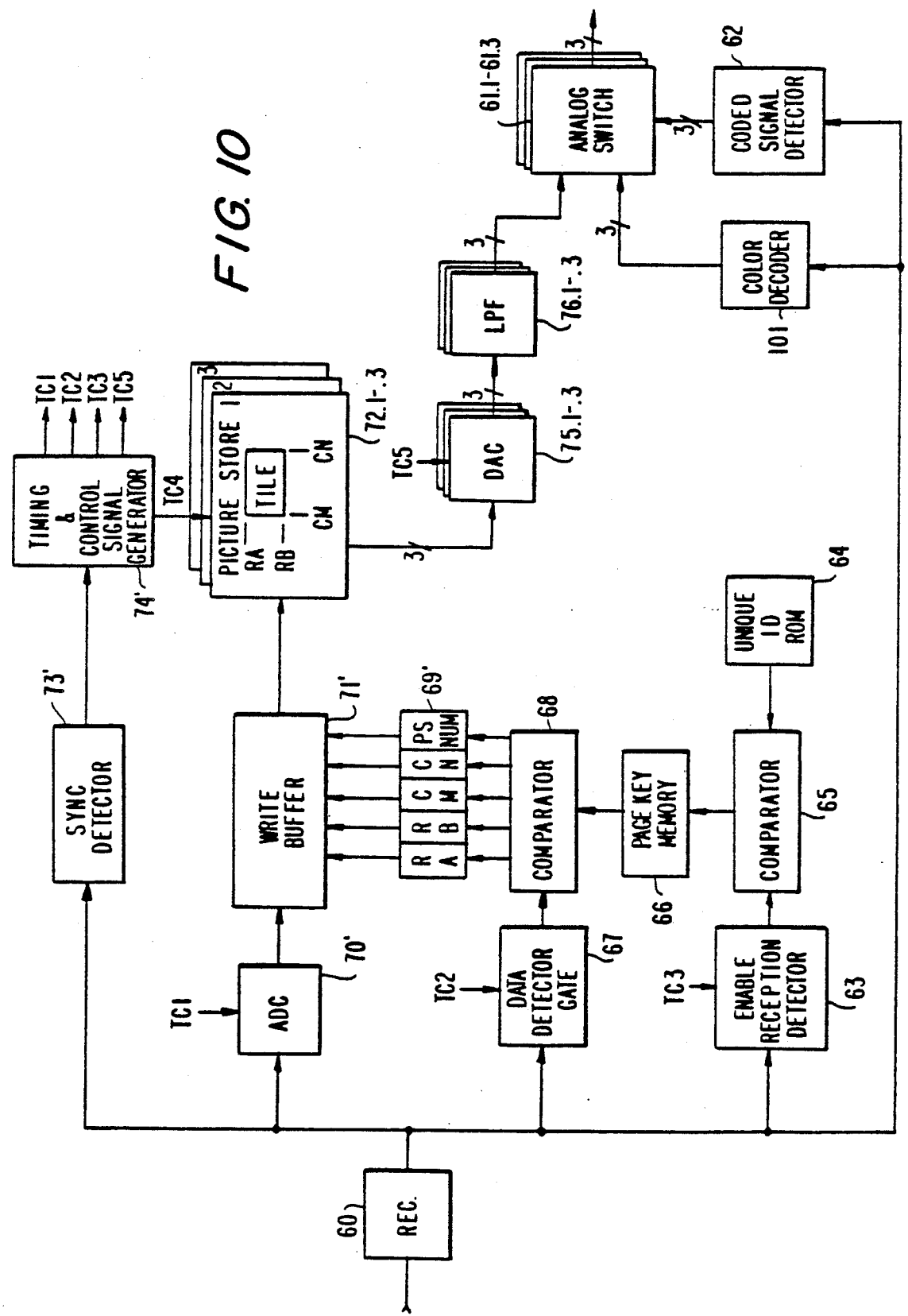
FIG. 10 is a block diagram of a decoder in the second embodiment of the invention.

FIG. 10 shows a block diagram of a decoder for the second embodiment. Components the same as those in FIG. 6 are designated with the same reference number. The decoder is substantially similar as the decoder of the first embodiment with the exception that the decoder is now capable of processing color signals and the encoded data selectively includes television signals. In particular, a color decoder 101 is included between the output of the receiver 60 and the input of the analog switch 61.1–61.3. The register 69' includes a register element for storing the number of the picture store. The synchronizing signal detector 73' outputs field synchronizing signals in addition to line synchronizing signals. The write buffer 71' now accesses three picture stores 72.1–72.3 corresponding to the three color components, red, blue and green. The outputs of these picture stores 72.1–72.3 are applied to three digital-to-analog converters 75.1–75.3, and then to three low-pass filters 76.1–76.3 for application to the other inputs of the three analog switches 61.1–61.3.

Numerous alterations of the structure herein disclosed will suggest themselves to those skilled in the art. However it is to be understood that the embodiments herein disclosed are for purposes of illustration only and not to be construed as a limitation of the invention. All such modifications which do not depart from the spirit of the invention are intended to be included within the scope of the appended claims.

What is claimed is:

1. A system for securely providing to subscribers restricted signals containing display information, for display on electronic screens, said system including an encoder for encoding update data for updating said display information, and a plurality of decoders for decoding said update data and generating a display of a portion of said display information, characterized in that said encoder comprises:

means for generating a first data stream, said first data stream including a plurality of information identification codes each corresponding to a particular portion of said display information, and a plurality of display identification codes each corresponding to one of said plurality of decoders, each of said information identification codes being associated with at least one display identification code to thereby form information identification code-display identification code sets indicative of the particular portion of display information which each subscriber is authorized to receive;

means for generating a sequence of second data streams including at least one of (i) said information identification codes, (ii) display screen coordinates of an area in a relevant display screen of the respective display information requiring update data, said area having a length less than a full row of data extending across an entire display screen, and (iii) the respective update data; and means for transmitting said first data stream followed by said sequence of second data streams;

and in that each of said decoders comprises:

means for associating the relevant decoder with one of said display identification codes;

means for recognizing said one display identification code and for storing the information identification code associated with said one display identification code;

means for retrieving said display screen coordinates of the update data corresponding to each of said stored information identification codes;

means for storing said update data at the related display screen coordinates for each associated portion of said display information for subsequent display; and means for selectively displaying said stored portion of display information.

2. A system as claimed in claim 1, wherein said encoder comprises:

a memory containing the display identification codes of said subscribers and the information identification codes of the particular portion of display information which each of said subscribers, as identified by said display identification codes, is authorized to receive, said memory further including the configuration of each of said particular portions, and a microcomputer connected to said memory for generating said first and second data streams.

3. A system as claimed in claim 2, wherein said encoder further comprises a modem for receiving said update data from an information source, said modem being coupled to an input of said microcomputer, and a video generation unit coupled to an output of said microcomputer for converting said first data stream and said sequence of second data streams into video signals for transmission.

4. A system as claimed in claim 1, wherein said decoder comprises a first memory in which one of said display identification codes is stored, a first comparator for comparing said one stored display identification code with said received display identification codes in said first data stream, and a second memory for storing at least one of said information identification codes when said comparator finds a display identification code in said first data stream corresponding to said one stored display identification code.

5. A system as claimed in claim 4, wherein said decoder further comprises a second comparator for comparing the stored information identification code with the information identification codes in said second data stream, and a third memory for storing the display screen coordinates of the update data accompanying one of said information identification codes when said one information identification code matches one of said stored information identification codes.

6. A system as claimed in claim 5, wherein said decoder further comprises a write buffer for receiving the update data accompanying said one information identification code and the corresponding display screen coordinates, and a picture store coupled to an output of said write buffer into which said update data is written at an address corresponding to said display screen coordinates, an output of said picture store being an output of said decoder.

7. A system as claimed in claim 1, wherein said encoder further comprises means for generating an encoded signal flag prior to said first data stream, and said decoder further comprises means for detecting said encoded signal flag and means for preparing said decoder to receive encoded signals.

8. A system as claimed in claim 7, wherein said preparing means comprises a controllable analog switch having a first input coupled to an input of said decoder, a second input coupled to an output of said decoder, and an output for providing video signals for display by said displaying means, said controllable analog switch being controlled by said encoded signal flag detecting means.

9. A system as claimed in claim 8, wherein said encoded signal flag generating means retransmits said encoded signal flag after a first predetermined period of time, and wherein said encoded signal flag detecting means causes said analog switch to switch to the input of said decoder 14, after detecting a first encoded signal flag, said encoded signal flag detecting means does not detect a second encoded signal flag within a predetermined period of time after said first encoded signal flag, said second predetermined time period being longer than said first predetermined time period.

10. The system of claim 1, wherein each of said information identification code-display identification code sets is comprised of a single information identification code and a single display identification code.

11. The system of claim 1, wherein said update data is a subset of its respective particular portion of display information.

12. The system of claim 1, wherein said display information comprises pages of information.

13. The system of claim 12, wherein said information identification codes comprise page key codes corresponding to said pages of information.

14. The system of claim 13, wherein each of said page key codes corresponds to a single one of said pages of information.

15. The system of claim 1, wherein said restricted signals comprise video signals.

16. The system of claim 1 wherein said display screen coordinates comprise row and column coordinates.

17. A system for securely providing to subscribers restricted signals containing display information and selected television signals, for display on electronic screens, said system including an encoder for encoding update data for creating particular portions of display information, and a plurality of decoders for decoding said update and generating said particular portions of display information, characterized in that said encoder comprises:

means for generating a first data stream including a plurality of information identification codes each corresponding to one of said particular portions of display information, or to one of said television signals, and a plurality of display identification codes each corresponding to one of said plurality of decoders, each of said information identification codes being associated with at least one display identification code to thereby form information identification code-display identification code sets indicative of the particular portions of display information and the selected television signals which each subscriber is authorized to receive;

means for generating a second data stream, said second data stream including information identification codes for the selected television signals and for the update data to be transmitted in a following time period corresponding to a picture frame of said selected television signals, coordinates of a temporal location in said time period of said television signals, coordinates of a temporal location in said time period of said update data, and coordinates of an area in a relevant display screen requiring said update data;

means for providing said selected television signals and said update data and for positioning said television signals and said update data at said respective coordinates in said time period; and means for transmitting said first and second data streams followed by said time period containing the picture frame of said television signals and said update data;

and in that each of said decoders comprises:

means for associating the relevant decoder with one of said display identification codes;

means for recognizing said one display identification code in said first data stream and for storing the information identification code associated with said one display identification code;

means for retrieving said temporal coordinates in said time period of said television signals and update data and said display screen coordinates of said update data corresponding to each of said stored information identification codes;

means for storing said update data at the related display screen coordinates for each particular portion of display information for subsequent display; and means for selectively displaying either said particular portion of display information or said television signals using the coordinates therefor.

18. A system as claimed in claim 17, wherein said encoder comprises a memory containing the display identification codes of said subscribers and the information identification codes of the particular portions of display information and selected television signals which each of said subscribers, as identified by said display identification codes, is authorized to receive, said memory further including the display configuration of each of said particular portions, and a microcomputer connected to said memory for generating said first and second data streams and said update data.

19. A system as claimed in claim 18, wherein said encoder further comprises a modem for receiving said update data from an information source, said modem being coupled to an input of said microcomputer, a source of said selected television signals, and a video generation unit coupled to an output of said microcomputer and said selected television signals source for converting said first data stream, said second data stream, said update data and said television signals into video signals for transmission.

20. A system as claimed in claim 17, wherein said decoder comprises a first memory in which one of said display identification codes is stored, a first comparator for comparing said one stored display identification code with said received display identification codes in said first data stream, and a second memory for storing said information identification codes when said comparator finds a display identification code in said first data stream corresponding to said one stored display identification code.

21. A system as claimed in claim 20, wherein said decoder further comprises a second comparator for comparing the stored information identification code with the information identification codes in said second data stream, and a third memory for storing both the temporal coordinates of the update data and the selected television signals and the display screen coordinates of the update data following said information identification codes when said information identification codes match said stored information identification code.

22. A system as claimed in claim 21, wherein said decoder further comprises a write buffer for receiving the update data and the television signals following said display information codes and the corresponding display screen coordinates in said third memory, and a plurality of picture stores coupled to an output of said write buffer into which said update data and said television signals are written at addresses corresponding to said display screen coordinates, an output combination of said picture stores being an output of said decoder.

23. A system as claimed in claim 17, wherein said encoder further comprises means for generating an encoded signal flag prior to said first data stream, and said decoder further comprises means for detecting said encoded signal flag and means for preparing said decoder to receive encoded signals.

24. A system as claimed in claim 23, wherein said preparing means comprises a controllable analog switch having a first input coupled to an input of said decoder, a second input coupled to an output of said decoder, and an output for providing video signals for display by said displaying means, said controllable analog switch being controlled by said encoded signal flag detecting means.

25. A system as claimed in claim 24, wherein said encoded signal flag generating means retransmits said encoded signal flag after a first predetermined period of time, and wherein said encoded signal flag detecting means causes said analog switch to switch to the input of said decoder if after detecting a first encoded signal flag, said encoded signal flag detecting means does not detect a second encoded signal flag within a predetermined period of time after said first encoded signal flag, said second predetermined time period being longer than said first predetermined time period.

26. The system of claim 17, wherein each of said information identification code-display identification code sets is comprised of a single information identification code and a single display identification code.

27. The system of claim 17, wherein said update data is a subset of its respective particular portion of display information.

28. The system of claim 17, wherein said display information comprises pages of information.

29. The system of claim 28, wherein said information identification codes comprise page key codes corresponding to said pages of information.

30. The system of claim 29, wherein each of said page key codes corresponds to a single one of said pages of information.

31. The system of claim 17, wherein said restricted signals comprise video signals.

32. A decoder, for use in a system for securely providing to subscribers restricted signals containing display information, particular portions of which are updated in accordance with encoded update data, said decoder decoding said update data and generating a display of particular portions of said display information for display on electronic screens, said decoder comprising:

means for receiving a first data stream, said first data stream including a plurality of information identification codes each corresponding to a particular portion of said display information, and a plurality of display identification codes each corresponding to one of a plurality of decoders, each of said information identification codes being associated with at least one display identification code to thereby form information identification code-display identification code sets indicative of the particular portion of display information which each subscriber is authorized to receive;

means for receiving a sequence of second data streams, after said first data stream, said sequence of second data streams including at least one of (i) said information identification codes, (ii) display screen coordinates of an area in a relevant display screen of the respective portions of display information requiring update data, said area having a length less than a full row of data extending across an entire display screen, and (iii) the respective update data;

means for associating said decoder with one of said display identification codes;

means for recognizing said one display identification code and for storing the information identification code associated with said one display identification code;

means for retrieving said display screen coordinates of the update data corresponding to each of said stored information identification codes;

means for storing said update data at the related display screen coordinates for each associated portion of display information for subsequent display; and means for selectively displaying said stored portion of display information.

33. The decoder of claim 32, wherein each of said information identification code-display identification code sets is comprised of a single information identification code and a single display identification code.

34. The decoder of claim 32, wherein said update data is a subset of its respective particular portion of display information.

35. The system of claim 32, wherein said display information comprises pages of information.

36. The system of claim 35, wherein said information identification codes comprise page key codes corresponding to said pages of information.

37. The system of claim 36, wherein each of said page key codes corresponds to a single one of said pages of information.

38. The system of claim 32, wherein said restricted signals comprise video signals.

39. The system of claim 32 wherein said screen coordinates comprise row and column coordinates.

40. An encoder, for use in a system for securely providing to subscribers restricted signals containing display information, particular portions of which are updated in accordance with encoded update data, said encoder for encoding said update data, for updating particular portions of display information, for subsequent decoding of said update data in a plurality of decoders, for display on electronic screens, said encoder comprising:

means for generating a first data stream, said first data stream including a plurality of information identification codes each corresponding to a particular portion of said display information, and a plurality of display identification codes each corresponding to one of said plurality of decoders, each of said information identification codes being associated with at least one display identification code to thereby form information identification code-display identification code sets indicative of the particular portion of the display information which each subscriber is authorized to receive;

means for generating a sequence of second data streams including at least one of (i) said information identification codes, (ii) display screen coordinates of an area in a relevant display screen of the respective portions of display information requiring update data, said area having a length less than a full row of data extending across an entire display screen, and (iii) the respective update data; and means for transmitting said first data stream followed by said sequence of second data streams.

41. The encoder of claim 40, wherein each of said information identification code-display identification code sets is comprised of a single information identification code and a single display identification code.

42. The encoder of claim 40, wherein said update data is a subset of its respective particular portion of display information.

43. The system of claim 40, wherein said display information comprises pages of information.

44. The system of claim 43, wherein said information identification codes comprise page key codes corresponding to said pages of information.

45. The system of claim 44, wherein each of said page key codes corresponds to a single one of said pages of information.

46. The system of claim 40, wherein said restricted signals comprise video signals.

47. The system of claim 40 wherein said screen coordinates comprise row and column coordinates.

48. A decoding method, for use in a system for securely providing to subscribers restricted signals containing display information, particular portions of which are updated in accordance with encoded update data, said decoding method for decoding said update data and generating an information display, for display on electronic screens, comprising the steps of:

receiving a first data stream including a plurality of information identification codes, each corresponding to a particular portion of said display information, and a plurality of display identification codes, each corresponding to one of a plurality of decoders for decoding said update data, each of said information identification codes being associated with at least one display identification code to thereby form information identification code-display identification code sets indicative of the particular portion of the display information which each subscriber is authorized to receive;

receiving a sequence of second data streams, after reception of said first data stream, said sequence of second data streams including at least one of (i) said information identification codes, (ii) display screen coordinates of an area in a relevant display screen of the respective display information requiring update data, said area having a length less than a full row of data extending across an entire display screen, and (iii) the respective update data;

associating said decoder with one of said display identification codes;

recognizing said one display identification code and storing the information identification code associated with said one display identification code;

retrieving said display screen coordinates of the update data corresponding to each of said stored information identification codes;

storing the update data at the related display screen coordinates for each associated portion of said display information for subsequent display; and selectively displaying said stored portion of display information.

49. The system of claim 48 wherein said screen coordinates comprise row and column coordinates.

50. An encoding method for use in a system for securely providing to subscribers restricted signals containing display information, particular portions of which are updated in accordance with encoded update data, said encoder for encoding said update data, for updating particular portions of display information, for subsequent decoding of said update data in a plurality of decoders, for display on electronic screens, said encoding method comprising the steps of:

generating a first data stream including a plurality of information identification codes, each corresponding to a particular portion of said display information, and a plurality of display identification codes, each corresponding to one of said plurality of decoders, each of said information identification codes being associated with at least one display identification code to thereby form information identification code-display identification code sets indicative of the particular portion of the display information which each subscriber is authorized to receive;

generating a sequence of second data streams including at least one of (i) said information identification codes, (ii) display screen coordinates of an area in a relevant display screen of the respective portions of display information requiring update data, said area having a length less than a full row of data extending across an entire display screen, and (iii) the respective update data; and transmitting said first data stream followed by said sequence of second data streams.

51. The system of claim 50 wherein said screen coordinates comprise row and column coordinates.

* * * * *

UNITED STATES PATENT AND TRADEMARK OFFICE
CERTIFICATE OF CORRECTION

PATENT NO. : 5,142,576
DATED : August 25, 1992
INVENTOR(S) : Joseph S. Nada

It is certified that error appears in the above-indentified patent and that said Letters Patent is hereby corrected as shown below:

Cover page, in the Abstract, line 5, "saidd" should be --said--;
[Specification, abstract, p. 29, line 4]

Cover page, in the Abstract, line 5, after "update" insert --data,--;
[Specification, abstract, p. 29, line 5]

Column 9, line 11, after "update" insert --data--;
[Amendment 5/16/91, p. 6, claim 10, line 7]

Signed and Sealed this

Fifteenth Day of August, 1995

Attest:

BRUCE LEHMAN

*Attesting Officer*     *Commissioner of Patents and Trademarks*